United States Patent
Zolezzi Garretón et al.

(10) Patent No.: US 12,227,438 B2
(45) Date of Patent: Feb. 18, 2025

(54) METHOD AND APPARATUS FOR PLASMA TREATMENT OF LIQUIDS IN CONTINUOUS FLOW

(71) Applicant: AIC Chile SpA, Concón (CL)

(72) Inventors: Alfredo Zolezzi Garretón, Concón (CL); Maximiliano Saona Acuña, Concón (CL); Rubén Viñuela Sepúlveda, Concón (CL); Roberto Contreras Machuca, Concón (CL); Alfredo Zolezzi Campusano, Concón (CL); Frederik Knop Rodríguez, Concón (CL); Javier Urrutia Pieper, Concón (CL)

(73) Assignee: PLASMA WATER SOLUTIONS INC., Dover, DE (US)

( * ) Notice: Subject to any disclaimer, the term of this patent is extended or adjusted under 35 U.S.C. 154(b) by 855 days.

(21) Appl. No.: 17/294,628

(22) PCT Filed: Nov. 16, 2018

(86) PCT No.: PCT/IB2018/059072
§ 371 (c)(1),
(2) Date: May 17, 2021

(87) PCT Pub. No.: WO2020/099914
PCT Pub. Date: May 22, 2020

(65) Prior Publication Data
US 2022/0009801 A1    Jan. 13, 2022

(51) Int. Cl.
C02F 1/46    (2023.01)
C02F 1/30    (2023.01)
H05H 1/24    (2006.01)

(52) U.S. Cl.
CPC .............. *C02F 1/4608* (2013.01); *C02F 1/30* (2013.01); *H05H 1/24* (2013.01); *C02F 2201/46* (2013.01);
(Continued)

(58) Field of Classification Search
CPC ...... A61L 2/14; C02F 1/46; C02F 1/30; C02F 1/32; H05H 1/24; H05H 1/30
See application file for complete search history.

(56) References Cited

U.S. PATENT DOCUMENTS

| | | |
|---|---|---|
| 2012/0024718 A1* | 2/2012 | Foret ................... C02F 11/004 205/687 |
| 2015/0139853 A1* | 5/2015 | Zolezzi-Garreton ........................ C02F 1/4608 422/186.23 |
| 2016/0251240 A1 | 9/2016 | Fraser et al. |

FOREIGN PATENT DOCUMENTS

| | | |
|---|---|---|
| EP | 2153851 A1 | 2/2010 |
| EP | 3321233 A1 | 5/2018 |

OTHER PUBLICATIONS

International Search Report for related International Application No. PCT/IB2018/059072; report dated May 22, 2020; (8 pages).
(Continued)

*Primary Examiner* — Walter D. Griffin
*Assistant Examiner* — Cameron J Allen
(74) *Attorney, Agent, or Firm* — K&L Gates LLP

(57) ABSTRACT

The disclosure refers to a method, reaction chamber and system for treatment of liquids in continuous flow including the steps of receiving a liquid for treatment in a reaction chamber; converting q flow of liquid for treatment in a biphasic liquid-gas flow; directing the biphasic flow to a central section of the reaction chamber, where an electric field is applied; ionizing the gaseous fraction of the biphasic flow that passes through said central section; sustaining an (Continued)

ionization regime generating non-thermal plasma throughout the central section of the reaction chamber; leading the biphasic flow under the ionization regime to a discharge section of the reaction chamber, where the electric field is applied, generating the deionization of the gaseous fraction and causing the biphasic flow to reduce its velocity, which results in the condensation of biphasic flow; and removing a flow of treated liquid from said discharge section.

25 Claims, 8 Drawing Sheets

(52) U.S. Cl.
CPC .... *C02F 2209/03* (2013.01); *C02F 2301/024* (2013.01); *C02F 2301/066* (2013.01); *C02F 2303/04* (2013.01); *C02F 2305/023* (2013.01); *H05H 2245/20* (2021.05)

(56) References Cited

OTHER PUBLICATIONS

Written Opinion for related International Application No. PCT/IB2018/059072; report dated May 22, 2020; (8 pages).

\* cited by examiner

METHOD AND APPARATUS FOR PLASMA TREATMENT OF LIQUIDS IN CONTINUOUS FLOW

CROSS-REFERENCE TO RELATED APPLICATIONS

This application is the National Stage filing under 35 U.S.C. 371 of International Application No. PCT/IB2018/059072, filed on Nov. 16, 2018, the contents of which are all hereby incorporated by reference herein in their entirety.

FIELD

The present invention refers to a method for the treatment of liquids in continuous flow, turning a liquid into a biphasic stream, which is temporarily ionized by a high intensity electric field, keeping an ionization regimen and generating non-thermal plasma in order to promote the degradation of organic compounds and the inactivation of microorganisms in said liquid.

Additionally, the invention refers to a reaction chamber for the treatment of liquids in continuous flow, for the temporary conversion of the liquid in a biphasic stream and the ionization of said biphasic stream inside the reaction chamber.

Finally, the invention also refers to a system for the treatment of liquids in continuous flow, which comprises the reaction chamber of the present invention.

BACKGROUND

The increasing need of having reliable and compact systems for the treatment of liquids, mainly for decontamination of water, has moved the industry to create different mechanisms of treatment considered non-traditional. Among said treatment mechanisms, the use of plasma for the treatments of fluids can be mentioned.

Within this context, the publication EP 3321233 entitled "Methods and device for in-stream aqueous medium treatment" considers a reactor in which plasma is applied to the stream of liquid to be treated, using a supersonic biphasic flow, since the speed of sound decreases inside the reaction chamber. According to said publication, all pathogen microorganisms known would be eliminated in a short time, simply by implementing the treatment mechanisms disclosed therein, among them, plasma.

However, nothing contained in the publication EP 3321233 refers to providing a method, a reaction chamber and a system for the treatment of a liquid able to treat the liquid effectively, generating a steady state of plasma in a biphasic flow that passes through the reaction chamber, thus promoting the generation of a liquid in which the organic and inorganic compounds have been degraded and the microorganisms present, inactivated.

In addition, patents U.S. Pat. Nos. 9,023,214 and 0,475,713 disclose processes to apply particles of plasma to a liquid, more specifically to drops of a liquid suspended in a gaseous medium in order to promote a variety of interactions in said biphasic mixture. In this respect, the present invention is a further development of the cited patents, which increases the efficiency and efficacy of the process and devices disclosed in the cited patents. The present invention, in fact, comprises a complete development of the liquids treatment mechanism, the reaction chamber and the system involved in said treatment, offering an optimal solution for the treatment of waters by transforming the fluid in a biphasic liquid-gas flow and the later ionization of the gaseous phase, thus generating non-thermal plasma.

This process promotes chemical reactions at low temperature and under a continuous flow, generating free radicals, hydrolysis, and oxidation-reduction reactions, among other reactions. Some of the technological applications are oriented to degrade the organic compounds and inactivate microorganisms.

SUMMARY

The invention refers to a method for the treatment of liquids in continuous flow, where said method comprises the following steps:

a. receiving the flow of liquid for treatment in a reaction chamber through at least one inlet opening in said reaction chamber, directing said flow of liquid for treatment to an inlet section of the reaction chamber;
b. converting the flow of liquid for treatment in a biphasic liquid-gas flow in said inlet section;
c. directing the biphasic flow to a central section of the reaction chamber, where an electric field is applied;
d. ionizing the gaseous fraction of the biphasic flow that passes through said central section, as a result of the interaction between the biphasic flow and the applied electric field;
e. sustaining an ionization regime generating non-thermal plasma throughout the central section of the reaction chamber, where said ionization regime is sustained by controlling the electric field applied in said central section;
f. directing the biphasic flow under the ionization regimen to a discharge section of the reaction chamber apart from the central section, where the electric field is not applied, generating the deionization of the gaseous fraction and causing the biphasic flow to reduce its velocity, which results in the condensation of biphasic flow; and
g. removing a flow of treated liquid from said discharge section through at least one discharge opening in the reaction chamber.

According to an embodiment, the step of receiving the flow of fluid in the reaction chamber also comprises pressurizing and speeding up the flow of liquid under turbulent conditions towards the reaction chamber. Additionally, the flow of liquid speeded up under turbulent conditions generates a pressure drop in the inlet section of the reaction chamber, promoting that the biphasic flow has a great contact surface between the phases forming it.

According to an embodiment, the step of converting the flow of liquid in a biphasic flow is promoted by the partial release of gases dissolved in the liquid to be treated and the partial evaporation thereof.

According to an embodiment, the step of leading the biphasic flow to the central section of the reaction chamber comprises directing said biphasic flow in such a way that it contacts the internal walls of the reaction chamber in its central section.

Said central section can comprise at least a pair of electrodes that generate the electric discharge to produce the electric field applied in said central section. In this context, the step of ionizing the gaseous fraction of the biphasic flow comprises the application of an electric field between the electrodes, which intensity exceeds the breakdown voltage of the gaseous phase of said biphasic flow.

According to an embodiment, the step of directing the biphasic flow under the state of plasma to the discharge section of the reaction chamber comprises reconverting the biphasic flow in the flow of fluid treated.

According to an embodiment, the electric field can be generated through a potential difference between the electrodes, where said potential difference is applied by at least one high-frequency power source. In this context, the step of sustaining the ionization regime generating non-thermal plasma comprises the use of a current limiter in order to limit the current circulating through the electrodes. Said current limiter can be integrated to the at least one power source that applies the potential difference.

According to an embodiment, the electric field can be generated through a potential difference between the electrodes, where said potential difference is applied by at least one DC power source, which can operate at continuous or pulsating mode and it also comprises a current limiter to limit the current circulating through the electrodes.

Said current limiter can be passive in the form of a steady self-adjusting system, or active in the form of a feedback controller.

In addition, the invention refers to a reaction chamber for the treatment of liquids comprising:
  at least one inlet opening, through which the flow of fluid to be treated in the reaction chamber is received;
  an inlet section, where the flow of fluid to be treated is converted in a biphasic liquid-gas flow;
  a central section configured to apply an electric field to the reaction chamber, ionizing the gaseous fraction of the biphasic flow passing through the central section, and to sustain an ionization regime, generating non-thermal plasma throughout the central section by controlling the applied electric field;
  a discharge section next to the central zone with the electric field, where the deionization of the gaseous fraction is generated, and where a reduction of the biphasic flow's velocity occurs, which results in the condensation of the biphasic flow; and
  a discharge opening through which a flow of treated liquid is removed.

According to an embodiment, the inlet section of the reaction chamber comprises at least a nozzle arranged in order to accelerate the flow of liquid in turbulent conditions, promoting the biphasic flow to have a great surface of contact between the two phases. The nozzle can comprise a discharge section expanding into the reaction chamber by increasing the cross-section of said discharge section of the nozzle, generating a pressure drop in the inlet section of the reaction chamber. Additionally, said nozzle can direct the biphasic flow under turbulent conditions to the internal walls of the reaction chamber, mainly in its central section.

According to an embodiment, the internal volume of the reaction chamber is filled with turbulent biphasic flow up to the discharge section of the reaction chamber.

According to an embodiment, the central section comprises at least a pair of electrodes that generate an electric discharge in order to produce the electric field applied in said central section. In this context, according to a preferred embodiment, the electric field between the electrodes has an intensity exceeding the breaking voltage of the biphasic flow's gaseous phase.

Finally, the invention also refers to a system for the treatment of liquids in continuous flow comprising at least one reaction chamber according to the present invention. Additionally, said system can comprise at least one current limiter, able to control the electric field applied in the reaction chamber, limiting the current that circulates through the electrodes.

According to an embodiment, the system also comprises a high-pressure pump upstream the reaction chamber in order to pressurize the fluid to be treated before entering the reaction chamber and increasing the fluid pressure in the range of 0.5 to 150 bar(g), more preferably in the range of 2 to 70 bar(g). In addition, the system can comprise a pressure gauge placed between the at least one high pressure pump and the at least one inlet opening of the reaction chamber, for the adjustment of the reaction chamber's feeding pressure.

Applying feeding pressures of 150 bar(g), it is possible to reach nozzle discharge velocities of around 157 m/s, considering an efficiency of the nozzle for transforming mechanic energy of 82% at said operation point.

By using a vacuum pump at the discharge, it is possible to operate the reaction chamber at feeding pressures of 0.5 bar(g), obtaining flow speeds in the range of 7 m/s when operating a nozzle with an efficiency for transforming mechanic energy of 50% at said operation point.

According to an embodiment, the system also comprises at least one vacuum pump downstream the reaction chamber in order to generate a level of vacuum towards the at least one discharge opening of the reaction chamber, which reaches a value close to the biphasic fluid's vapor pressure. Additionally, the system can comprise a vacuum gauge placed between the at least one discharge opening of the reaction chamber and the at least one vacuum pump, for the adjustment of the vacuum level in the discharge section of the reaction chamber.

According to an embodiment, the system also comprises a flow gauge downstream the reaction chamber, for the adjustment of the throughput of treated liquid.

According to a preferred embodiment, the system comprises at least one high-frequency power source, where the electric field is generated through a potential difference between at least one pair of electrodes in the central section of the reaction chamber, where said potential difference is applied by the at least one power source and is controlled by the at least one current limiter. Said current limiter can be integrated to the at least one power source that applied the potential difference.

According to an embodiment, the system comprises at least one DC power source, which can operate at continuous or pulsating mode, also comprising the use of a current limiter in order to limit the current circulating though the electrodes, where the electric field is generated by a potential difference between the electrodes.

Said current limiter can be passive in the form of a steady self-adjusting system, or active in the form of a feedback controller.

According to an embodiment of the system, the at least one discharge opening in the discharge section of the reaction chamber is connected to at least one conduit with a cross-section greater than the discharge opening, thus facilitating the reconversion of the biphasic flow in a liquid flow.

According to an embodiment, the system can comprise two or more reaction chambers connected to each other in series or in parallel.

BRIEF DESCRIPTION OF THE DRAWINGS

The following figures are shown as part of the present invention, which are representations of preferred embodiments of the invention, therefore, they should not be considered as limiting the definition of the claimed invention.

DETAILED DESCRIPTION

By mentioning the figures attached hereto, the invention has been separated in the different aspects that make it up, in order to define the preferred embodiment of the invention.
Hydraulic Aspects
Hydraulic System The liquid to be treated is pressurized through a high-pressure pump, which rises the pressure in a range of, for example, 2 to 70 bar(g) at the inlet of the reaction chamber to the inlet section of said chamber. The pressurization of the fluid provides the necessary pressure to generate the hydrodynamic condition that enables the formation of plasma, when the reaction chamber is energized. The feeding pressure is adjusted through a pressure gauge as it can be noted in FIG. 2.

Additionally, a vacuum pump can be added at the reaction chamber's discharge in order to generate levels of vacuum that can reach values close to the steam pressure of the fluid. The implementation of the vacuum pump reduces the pressure requirements at the inlet of the reaction chamber to generate the hydrodynamic condition. The level of vacuum in the discharge section is adjusted through a vacuum gauge at a level above the steam pressure of the fluid, as it can be noted in FIG. 2.

Figure 2:
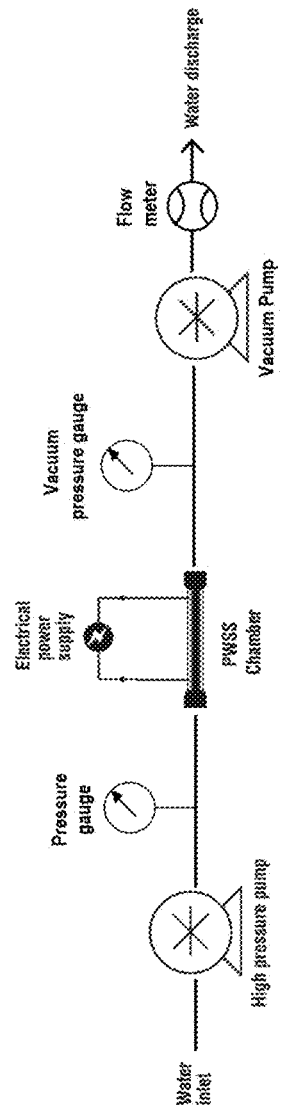
FIG. 2 is diagram of the system for the treatment of liquids in continuous flow, including the main hydraulic components of the system according to an embodiment of the invention.

Finally, the flow rate of is controlled through a flow gauge at the discharge, as it can be noted in FIG. 2.

Figure 1:
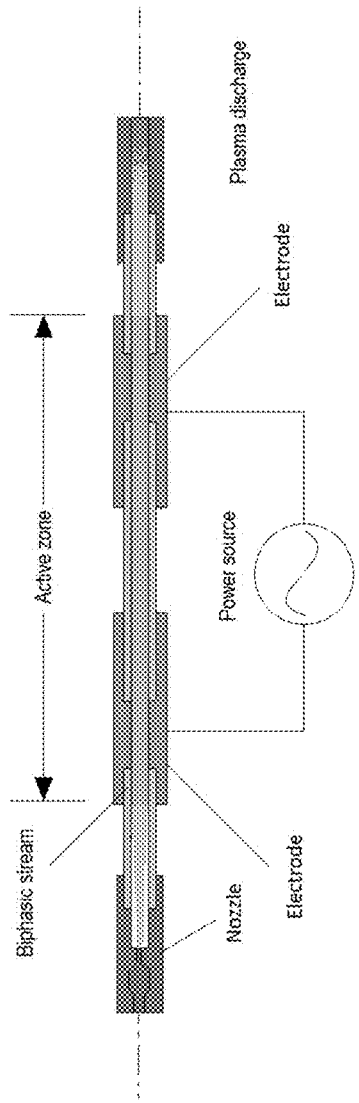
FIG. 1 is a representation of the reaction chamber for the treatment of liquids in continuous flow, according to an embodiment of the invention.

Additionally FIG. 1, is a more detailed schematic representation of the reaction chamber according to a preferred embodiment, identifying some of its components and, in particular, the active section. FIG. 1 also shows that the reaction chamber is arranged in an axial format, given by the cylindrical configuration of the reaction chamber.

General Characteristics of the Hydrodynamic Condition in the Reaction Chamber

In the reaction chamber, the liquid to be treated is transformed into a turbulent high-speed biphasic flow, specifically in the inlet section. In said section, the pressure inside the reaction chamber decreases to a point close to the vapor pressure of the liquid.

The gaseous portion of the biphasic flow is generated from the partial evaporation of the liquid, the degassing of the liquid and the plasma reaction gases. There is no injection of external gases.

The biphasic flow generated inside the reaction chamber, in the inlet section, has the characteristics of being turbulent in order to maximize the contact surface between the phases, and to improve the effect of ionized gas on the fluid when the plasma is generated.
Turbulence For the purposes of this method, turbulence is an irregular flow regime characterized by fast space-temporal changes of pressure and velocity.

The turbulence of the biphasic flow is initially generated by a nozzle that can be placed at the inlet section of the reaction chamber, where said nozzle can have different mechanisms using the energy of the flow to promote the formation of turbulence inside the reaction chamber, as well as external active mechanisms, such as ultrasound, that can help increasing said effect.

In order to allow the turbulence generated in the nozzle to increase the contact surface of the phases, the nozzle discharge expands into the reaction chamber by increasing its cross-section. In current designs, the rate of the gaseous volumetric fraction to the liquid volumetric fraction ranges from 5 to 70, for example, thus allowing a great contact surface between phases.

In reactors of 9.8 mm of internal diameter, for example, with a nozzle having a restriction of 0.6 mm, the volumetric fraction of the gaseous phase can be 270 times that of the liquid phase.

In addition, in reactors of 2.61 mm of internal diameter with a nozzle having a restriction of 1.5 mm, the volumetric fraction of the gaseous phase can be only 2 times the liquid phase.
Pressure Drop The low pressure of the biphasic flow facilitates the initiation of plasma, reducing the electrical breakdown voltage of the gaseous phase. The pressure drop is caused by expanding the high-speed flow of discharge from the nozzle inside the reaction chamber in its inlet section, reaching speeds that vary between 15 and 60 m/s for example.

Figure 3:
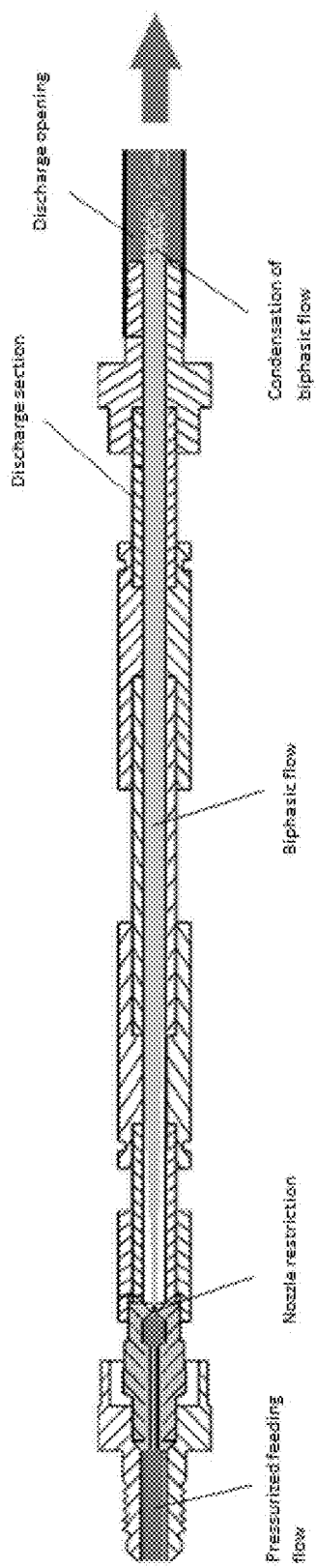
FIG. 3 is a diagram of the reaction chamber that generates the hydrodynamic condition of the low-pressure turbulent biphasic flow inside, up to the discharge zone, where the biphasic flow is condensed.

The pressure reduction causes partial adiabatic evaporation and partial degasification of the fluid, thus filling the reaction chamber internal volume with the turbulent biphasic flow, up to the discharge of the reaction chamber as indicated in FIG. 3.
Condensation of the Biphasic Flow At the discharge of the reaction chamber towards the discharge section, the condensation of the biphasic flow takes place, reducing the velocity of the biphasic flow in an inelastic collision, losing kinetic energy, which causes increase of pressure and density. After the condensation zone of the biphasic flow, a liquid phase is generated, where the gaseous volumetric fraction over the liquid volumetric fraction varies from, for example, 50 to 0.25 when there is ionization of the gaseous fraction in the biphasic flow. A schematic representation of the condensation zone is shown in FIG. 3.

The condensation zone tends to be stable in the discharge zone of the reaction chamber, where there is an increase of the inner cross-section when connecting the reaction chamber to a pipe of greater inner diameter at the discharge, as shown in FIG. 3.

Condition for the Formation of the Low-Pressure Turbulent Biphasic Flow

In order to keep the low-pressure condition of the biphasic flow inside the reaction chamber, it is necessary that the reaction force caused by the momentum variation of the flow, when it slows down during its condensation before leaving the reaction chamber, to be greater than the force of the pressure difference between the discharge pressure and the inner pressure.

The following expression describes the condition on the basis of the balance of forces to be met:

$$F_{momentum\ variation} > F_{Pressure}$$

$$\Delta Vm > A(P_2 - P_v)$$

Where $\Delta V$ is the speed variation of the biphasic flow when collapsing, when the condensation of the biphasic flow takes place, A is the cross-section where the condensation of the biphasic flow takes place, $P_2$ is the discharge pressure, $P_s$ is the steam pressure of the fluid representing pressure inside the reaction chamber, and m is the mass flow.

Outside the reaction chamber, immediately after the discharge section, the increase of the cross-section A increases the requirement of reaction force abruptly in order to sustain the condition of the low-pressure turbulent biphasic flow. It is at this point where the biphasic flow condensation zone becomes stable.

Model to Set the Minimum Operating Pressure

In order to evaluate at design level the minimum feeding pressure required, a model was developed based on the balance of forces caused by the pressure difference between the internal volume and the discharge section of the reaction chamber, and the variation of the momentum when the flow slows down just before the discharge section of the reaction chamber.

The use of this model allows optimizing the design in order to reduce the requirements of pressure and to reduce the pumping work associated to the pressurization of the liquid.

Below, the model predicting the minimum pressure of operation of the reaction chamber is presented.

$$P_{Min} = P_v + \frac{A_2(P_2 - P_v)}{2A_1\eta_{nozzle}\left(\eta_{momentum} - \frac{A_1}{A_2}\right)}$$

For the purposes of calculation of $P_{Min}$, the pressure inside the reaction chamber is considered as the vapor pressure of the fluid $P_v$. $A_1$ corresponds to the cross-section of the nozzle constraint at the inlet section of the reaction chamber, and $A_2$ at the inner cross-section of the reaction chamber in its central section. $\eta_{nozzle}$ and $\eta_{momentum}$ are the efficiency of the nozzle and the efficiency of the axial momentum respectively. These parameters are determined empirically.

Evaluation of the Minimum Pressure Model

When using the average values of $\eta_{nozzle}$ and $\eta_{momentum}$, the results from the predictive model obtained in experimental way can be compared in two cases of the reaction chambers known in order to generate the hydrodynamic condition with water at 20° C. In the table below, the parameters of the reaction chamber are shown in order to feed the model.

Table 1: Parameters of the Reaction Chambers or Reactors to Feed the Model

| Reactor | R1 | R2 |
| --- | --- | --- |
| $A_1$ [mm$^2$] | 1.04 | 1.43 |
| $A_2$ [mm$^2$] | 23.80 | 12.60 |
| $\eta_{nozzle}$ | 0.60 | 0.75 |
| $\eta_{momentum}$ | 0.87 | 0.80 |

Figure 4:
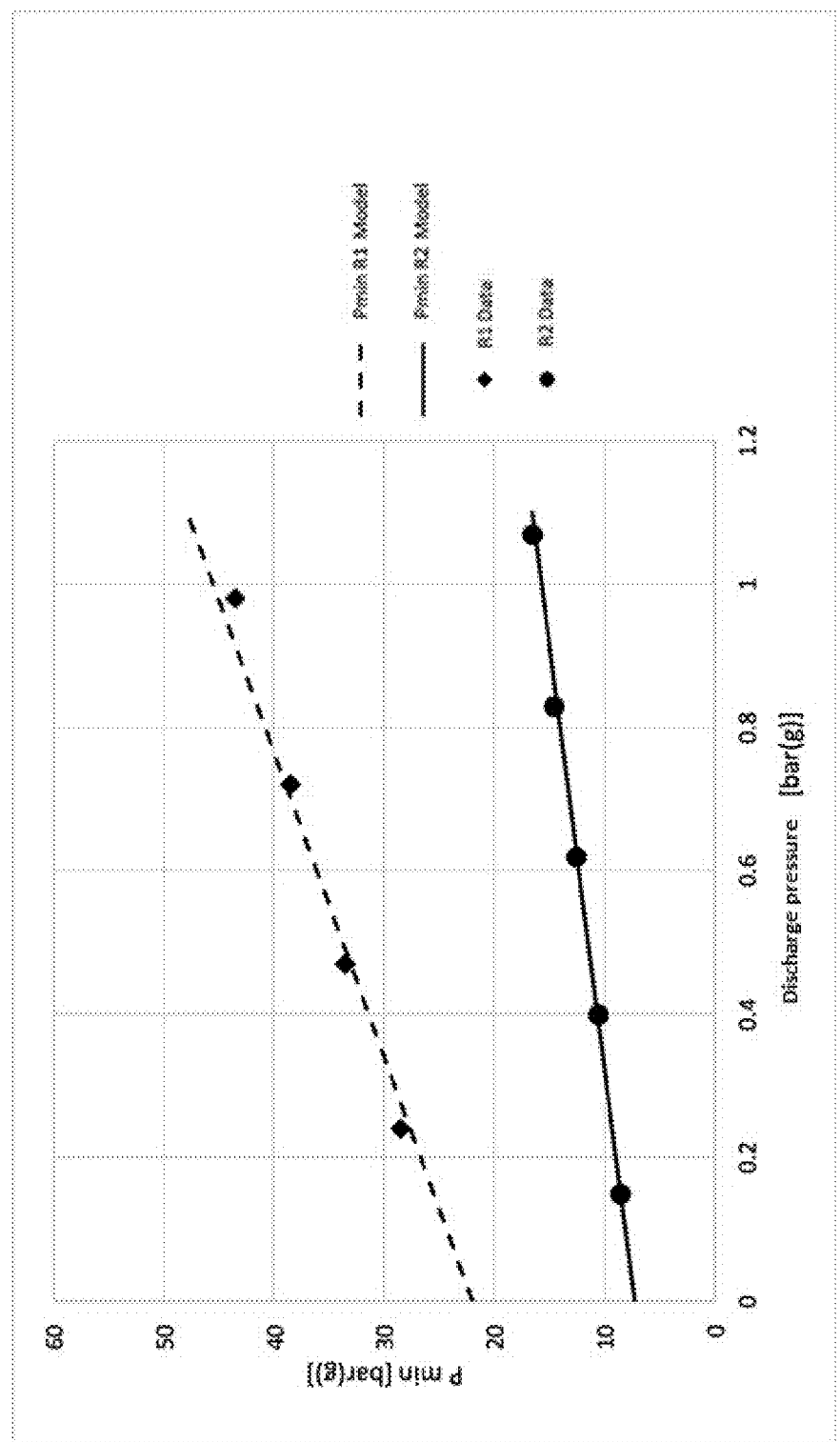
FIG. 4 is a graphic comparison of $P_{Min}$ according to a predictive model compared with data obtained in experimental tests.

In the chart of FIG. 4, it can be seen that the adjusted model is able to predict the minimum operating pressure for the cases of reaction chambers or plasma reactors already evaluated with the model.

Calculation of the Nozzle Efficiency

The nozzle efficiency $\eta_{nozzle}$ is considered as the efficiency of energy conversion of the pressure variation in kinetic energy. $\eta_{nozzle}$ can be expressed as a function of the mass flow and the applied pressure difference $\Delta P$. Where $A_1$ is the nozzle constraint area and $\rho_{Liq}$ is the liquid density.

$$\eta_{nozzle} = \frac{m^2}{2\rho_{Liq}A_1^2(\Delta P)}$$

In order to calculate $\eta_{nozzle}$ empirically, sweeping was done in the pressure difference applied in the nozzle, comprising the operation points of the reaction chamber. In current designs of the plasma reaction chamber, $\eta_{nozzle}$ ranges between 0.2 and 0.95 for example.

Calculation of the Efficiency of the Axial Momentum

The efficiency of the axial momentum $\eta_{momentum}$ corresponds to the loss of momentum of the biphasic flow due to loss of axial speed of the flow along the reaction chamber. This parameter depends on constructive factors, such as length, diameter and roughness of the inner walls of the reaction chamber, in addition to the shape of the nozzle stream, the type of diffuser used and the alignment thereof. This factor is obtained experimentally by solving $\eta_{momentum}$ in the equation of the minimum operating pressure.

$$\eta_{momentum} = \frac{A_1}{A_2} + \frac{A_2(P_2 - P_v)}{2A_1\eta_{nozzle}(P_1 - P_v)}$$

In some reaction chambers of the present invention, the values of $\eta_{momentum}$ va varies from, for example, 0.10 to 0.99 depending on its geometric features and the shape of the stream. The values obtained allow predicting $\eta_{momentum}$ in the design of the reaction chamber with similar geometric features and nozzle to those already tried. The $\eta_{momentum}$ value can be used as indicator of the variation of speed inside the reaction chambers and of the amount of energy lost when impacting on the walls.

Pumping Work

In current designs, the energy consumption associated with the pumping work consumes an important fraction of the required energy, for example, 10-80% of the total consumption of the system.

The pumping work of the assembly formed by the high-pressure pump and the vacuum pump shown in FIG. 2 can be reduced when increasing the vacuum level at suction zone.

The reduction of pressure at the discharge zone helps to reduce the requirement of pressure according to the model minimum feeding pressure evaluated in FIG. 4, being the main consumption of the pumping work.

When evaluating the specific pumping work using the reaction chamber previously identified as R2, with a content of bubbles of, for example, 18% at the outlet of the reaction chamber, and using the model that predicts the minimum operation pressure of the reaction chamber, based on the minimum requirement of pressure to relate the discharge pressure with that of feeding. Is possible to chart the pumping work required to operate the system with different levels of vacuum at discharge is possible.

Figure 5:
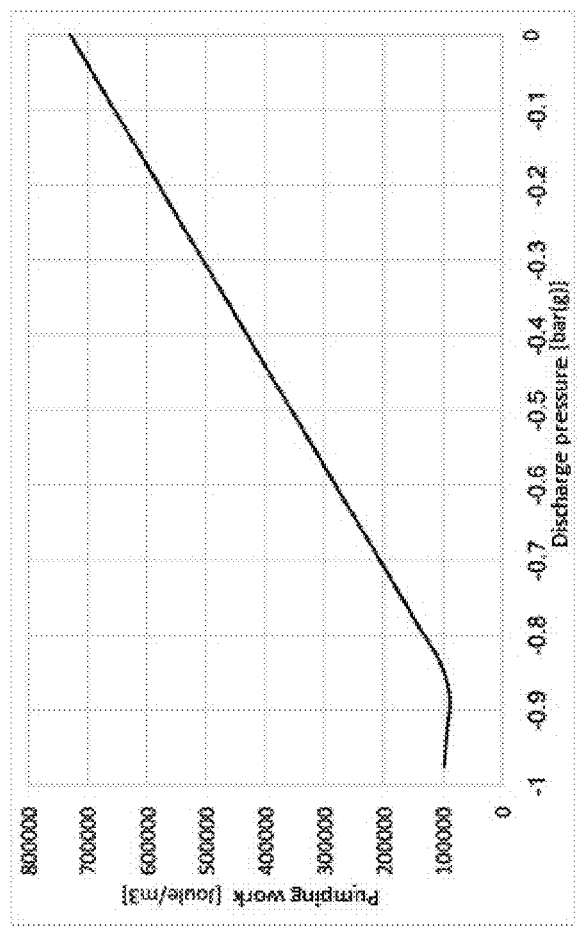
FIG. 5 is a graph of the specific pumping work for different levels of vacuum at the discharge section.

In the curve of FIG. 5 it can be noted that the discharge pressure to the outlet of the reaction chamber cannot be lower than the vapor pressure of the fluid.

Despite the hydrodynamic condition can be generated with low energy requirements, when reducing the discharge pressure, it is necessary for the pressure at the inlet section of the nozzle to be sufficiently high so as to have the necessary mechanic energy to increase turbulence and, therefore, to increase the contact surface between the phases of the biphasic flow. The use of vacuum, therefore, is convenient when the reduction of the feeding pressure does not compromise the contact surface between the phases of the biphasic flow.

Vacuum Pump

The vacuum pump should be able to handle flows with a content of bubbles that may reach 85% of its volumetric composition. As a design requirement, it is convenient to use technologies such as water ring compressors or phases separator, to pressurize the liquid phase independently from the gaseous phase.

Preconditioning Zone of the Biphasic Flow

The preconditioning zone is the necessary distance from the nozzle outlet at the inlet section, so that the liquid phase of the biphasic flow may reach the internal walls of the reaction chamber.

After the preconditioning zone there is the active zone, where the gaseous fraction of the biphasic flow is ionized. In this way the cooling of the electrodes, which are in contact with the biphasic flow, is ensured, and the electric insulation between the nozzle and the first electrode is improved.

Maximization of the Exchange Surface Between Phases Inside the Reaction Chamber

The methods and strategies used are shown below, whether by themselves or combined, in order to maximize the contact surface between the phases of the biphasic flow.
  a. Increased feeding pressure. The increased pressure helps to form smaller size drops, but it has a higher energy requirement due to the increased pumping work associated.
  b. Increased divergence angle of nozzle. Diffusers generate turbulence introducing changes in direction and cavitation before the constraint zone of the nozzle. The use of a diffuser increases the divergence of the stream in the chamber, but its use may have some drawbacks, since it directs the atomized drops against the inner wall of the reaction chamber, reducing the contact surface between the phases of the biphasic flow. Some of the mechanisms used to increase the divergence angle are:
     i. A mixing type diffuser
     ii. An orifice plate type diffuser
     iii. An orifice plate diffuser with multiple holes
  c. Incorporation of elements in order to increase the turbulence of the flow inside the reaction chamber, so as to avoid the arrangement of the flow when contacting the inner walls of the reaction chamber.

Electric Aspects

The turbulent biphasic flow is ionized through an electric field applied by the electrodes of the reaction chamber, which are subject to a potential differential able to exceed the breaking voltage of the biphasic medium in the active zone. In order to achieve this, there is a great dependence between the geometry of the reaction chamber, the maximum voltage applicable to the electrodes, and the vapor pressure of the fluid. A simplified way to analyze this dependence is through the Paschen's law, where there is a relationship between voltage (and therefore the maximum electric field), the distance of electrodes, and the vapor pressure of gas for similar constructive conditions of electrodes, as shown in the following equation.

$$V_B = \frac{aP_v(T)d_e}{\ln(P_v(T)d_e) + b}$$

Wherein:
  Pv(T): It represents the vapor pressure of the fluid depending on temperature. In the case of this method (not requiring heating the water, since evaporation is generated by vacuum), the typical operation ranges are about 4° C. to 45° C.; therefore, the vapor pressures are in the range of 813.5 Pa to 9594.4 Pa, much lower than the atmospheric pressure and which, by means of a power supply designed to work under these conditions, results into a very wide operating range. According to Paschen's law, at lower temperature the pressure decreases, thus, it is easier to exceed the breaking voltage; this allows increasing the distance between electrodes.
  $d_e$: Distance between electrodes. If the configuration is fixed, it sets the maximum electric field with a certain voltage. As the distance increases, a higher voltage is required to ionize the biphasic flow.
  a, b: Adjustment parameters of Paschen's model for a specific model, considering both adjustments according to the biphasic flow and the configuration of the electrodes and the reaction chamber.
  $V_b$: This is the voltage to be emitted by the power supply in principle in order to start the gas ionization.

Figure 6:
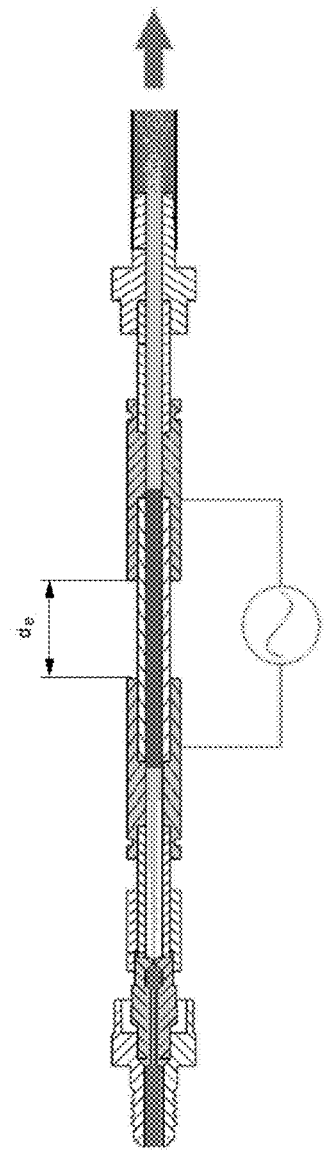
FIG. 6 is a schematic representation of the reaction chamber, showing the distance between electrodes.

By adjusting these parameters accordingly, it is established a correlation between the distance between the electrodes (de), vapor pressure, and the maximum voltage emitted by the power supply, as shown by FIG. 6.

In general, the distance between electrodes is not enough to estimate said voltage. The configuration and the dielectric coefficients play a very important role in the generation of the electric field; this is why the designs of the reaction chamber should be subject to electrostatic simulations in order to estimate the maximum electric field and its distribution.

Figure 7:
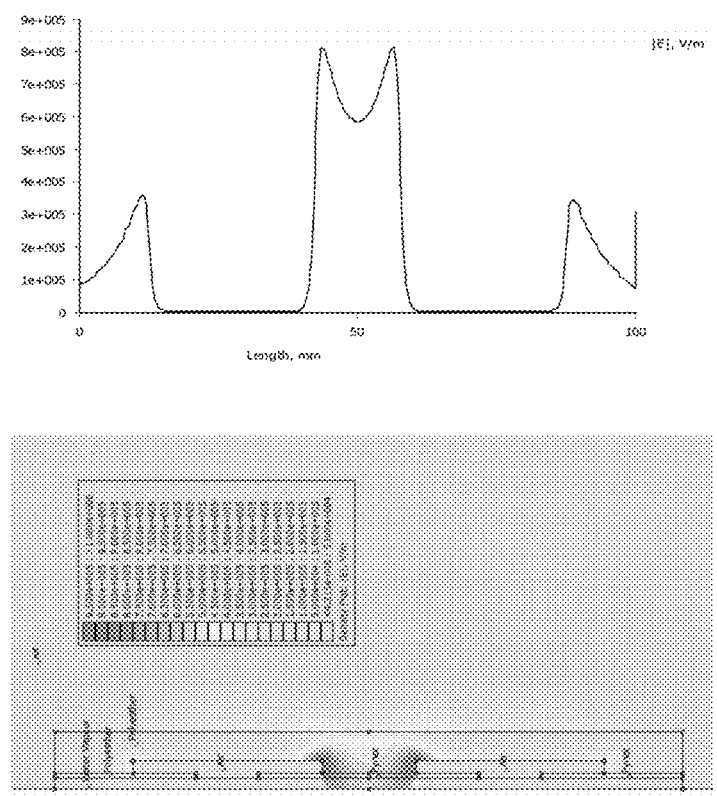
FIG. 7 is an axisymmetric representation of the electrostatic model of the reaction chamber, with the curve of intensity of the longitudinal electric field applied.

FIG. 7 shows an axisymmetric simulation of a real reaction chamber, where the distribution of the electric field in the volume can be observed. Additionally, it is presented a graph of the intensity of the electric field through a longitudinal path inside the reaction chamber. This information is very useful, since it allows identifying the zones where the ionization of the gaseous fraction will start, so as to ensure that said ionization of the gaseous fraction occurs in the right position, and may generate a conductive path between both electrodes in order to generate a steady plasma channel. In this particular case, it can be seen that the electric field is at its maximum in the central zone of the reaction chamber, which is precisely where the plasma is intended to start.

Figure 8:
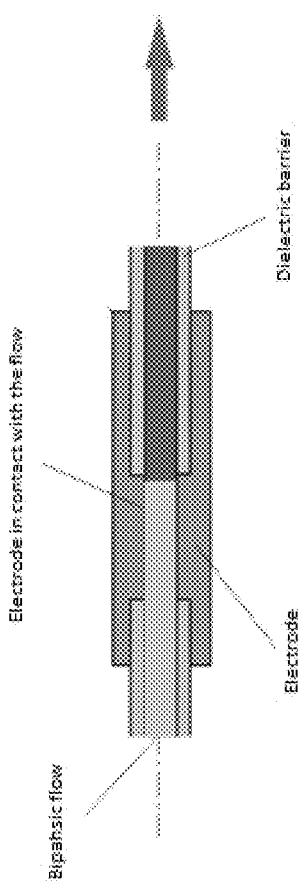
FIG. 8 is a detailed view of the electrode of the reaction chamber of the invention.

The use of capacitive electrodes allows injecting electric charges to the biphasic flow capacitively, thus facilitating the homogenization of plasma, generating distributed electrical paths from the walls of the reaction chamber to the inside, using the dielectric medium of the reaction chamber wall as a medium to apply the distributed discharge as shown in FIG. 8. It may be noted that this configuration resembles a capacitor, reflecting a capacitive compartment in the zone near the walls of the reaction chamber. This implementation improves the homogenization of plasma and reduces the affinity of the drops when adhering to the walls of the reaction chamber, obtaining an improved interaction between the liquid phase and the plasma in the reaction chamber.

The non-thermal plasma generated in the gaseous fraction has an energy density ranging, for example, between 0.144 and 7 W/mm3.

For example, when using a plasma reactor of 2.61 mm of inner diameters, with a nozzle having a constraint of 1.5 mm and an active zone of plasma formation 35 mm long, it is possible to reach an energy density of 7 W/mm3, using 880 W.

Additionally, when using a plasma reactor of 9.8 mm of inner diameter, with a nozzle having a constraint of 0.6 mm and an active zone of plasma formation of 500 mm long, it is possible to reach an energy density of 0.0133 W/mm3, using 500 W.

The heat generated by the plasma is eliminated with the flow. An additional device to eliminate the heat is not necessary.

Figure 9:
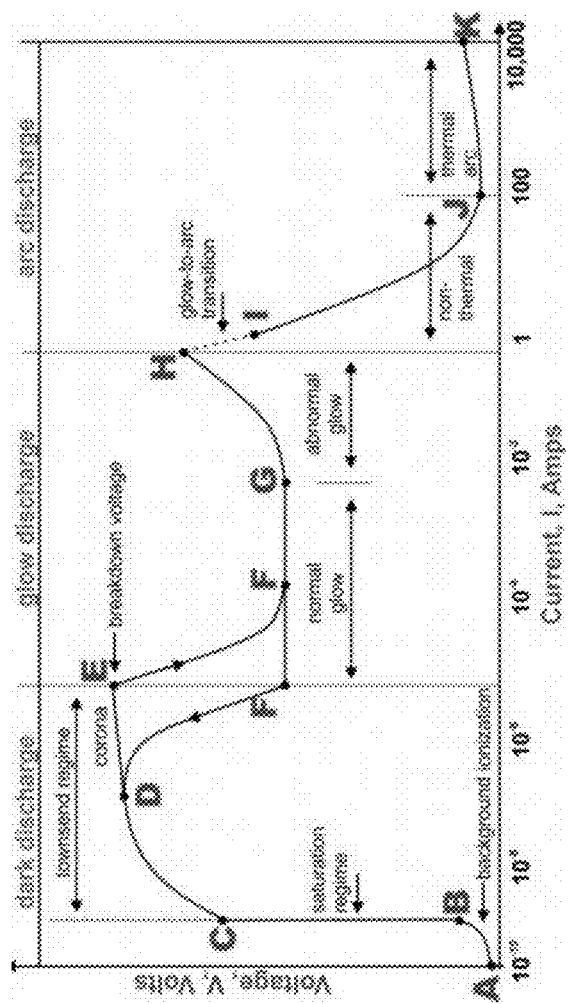
FIG. 9 is a graph of the current/voltage curve for the different operating conditions of plasma.

Once the plasma is initiated as a result of ionization, it operates steadily. To this effect, enough current is required to operate in the operation zone known as glow discharge (E-H) avoiding the transition to arc discharge (H) as shown in FIG. 9.

Due to this, the power supply should be able of working at two different points of operation:
  a. A high voltage and low current point required to trigger the ionization of gases, in accordance to Paschen's law.
  b. A medium voltage and controlled current operation point in order to keep plasma operating in the zones of glow discharge and non-thermal arc discharge between points E and J according to FIG. 9.

Operation of the Power Source

Since the reaction chamber behaves as an open circuit when the plasma is not initiated, and, in order to solve the issue of working in two different operation points, a power supply was designed incorporating a resonating module, which is able to accumulate energy when a significant load is not perceived (plasma not initiated) and, therefore, it increases the voltage several times at the outlet. Next to the resonator there is a step-up transformer in cascade designed with the right turns ratio to provide the necessary voltage and current for the operation under the glow discharge mode.

Figure 10:
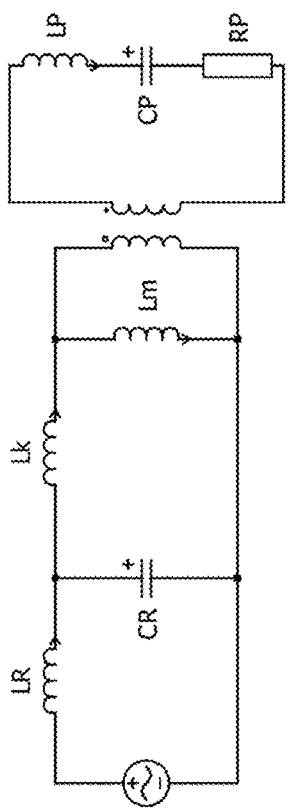
FIG. 10 is a representation of a model of passive loads, resonant tank and reaction chamber according to an embodiment of the invention.

FIG. 10 shows a simplified model of the power supply and the reaction chamber, where the system is fed from an initial inverting step, modeled as a CA power source adjusted to the system's resonance frequency as LR and CR, an ideal transformer with inductance and magnetization loss (Lk and Lm) and the reaction chamber in operation as a RLC charge (Rp, Lp, Cp).

Figure 11:
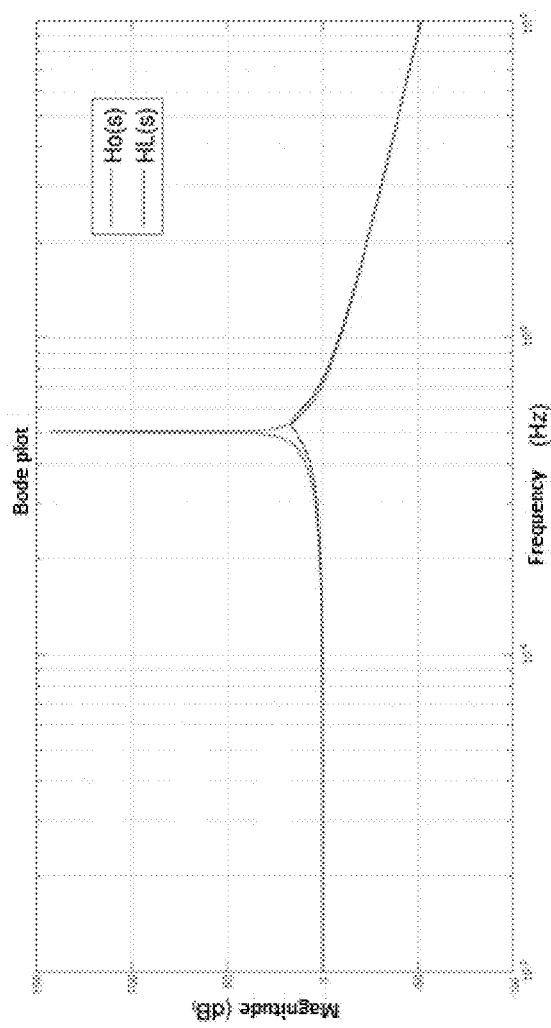
FIG. 11 is a graph of the resonant response in frequency of the system of the invention, in two regimes, without ionization and with plasma.

This model, in both operation modes, as described above, has two similar second order response curves, where without the plasma initiated (red curve Ho(S) in FIG. 11), an infinite asymptote of voltage gain is generated in the resonance frequency, and with the plasma initiated, a finite gain is generated, which depends on the resistive charge (blue curve, HI(S) in FIG. 11).

This way, the operation parameters of the reaction chamber can be adjusted modifying the constructive aspects of both the resonator and the step-up transformer.

Figure 12:
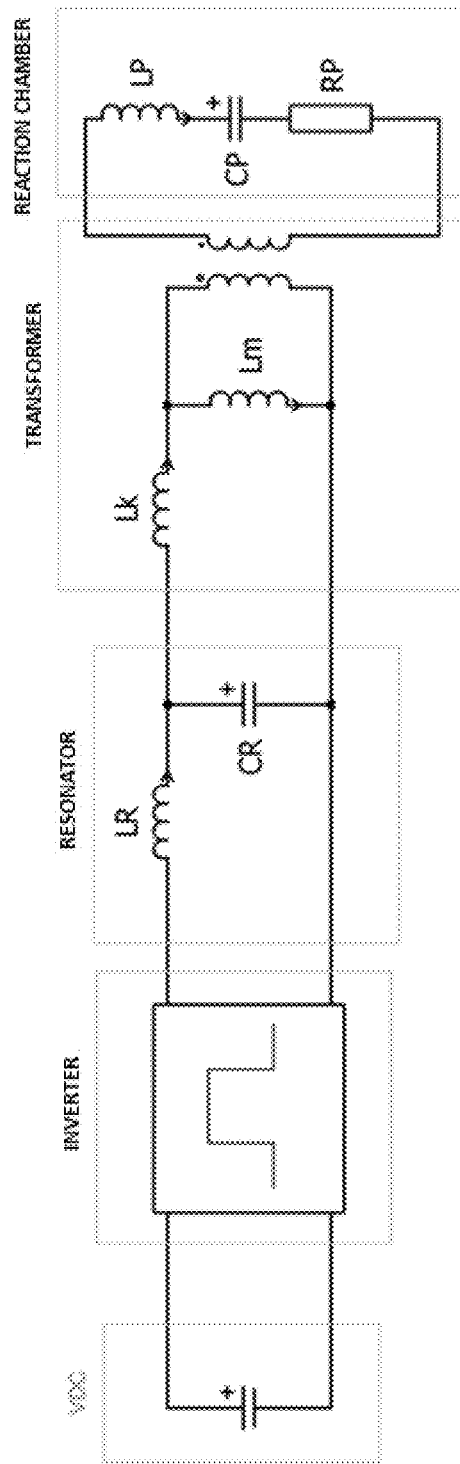
FIG. 12 corresponds to a model of passive loads, resonant tank and reaction chamber according to an embodiment of the invention.

As shown in FIG. 12, the energy supply system comprises the following main components:
  a. A constant continuous voltage source (VDC).
    This source provides the system with energy and in a certain range it can modify the power of the system depending on the voltage.
    Its basic operation parameters are:
      Vo: Continuous voltage emitted by the source.
      Io(rms): Current in RMS value measured at the outlet of the source, allowing to calculate the input power to the system together with Vo voltage.
  b. An inverting step that transforms the continuous voltage in a signal of alternating current to the required resonance frequency.
    Its basic operation parameters are:
      Fc: Switching frequency, which should be adjusted to the system's resonance parameters.
    The possibility of using a system to self-adjust the frequency in the inverting step, tuning with the natural resonance frequency of the system produces significant benefits. This is due to said resonance frequency varying mainly between the moment before and after the generation of plasma, but also to other factors, such as temperature and conductivity of the liquid, which modify the impedance of the reaction chamber.
  c. A resonating stage that accumulates energy and progressively increases the voltage when the plasma has not initiated, in order to achieve its ionization.
    Its basic operation parameters are:
      Fres: resonance frequency that should be selected in order to obtain the maximum coupling with the rest of the system.
      Under the condition of optimum coupling, the maximum voltage gain is obtained, which translates into plasma stability. If the frequency of the system drifts from the resonance frequency significantly, the system loses stability in the generation of the plasma.
      Umax: The maximum energy stored in the resonator. Although the model of an ideal resonator allows infinite accumulation of energy, in practice both the inductor and the capacitor have a maximum operating voltages and currents, which can destroy them if exceeded. The amount of energy to be stored will depend on the stability requirements of the chamber and the maximum voltage required.
    The use of a twisted cable of multiple electrically insulated strands each other (Litz wire) allows reducing the losses generated by the "skin effect", since in the case of working at a frequency of 50 kHz and with copper strands, the skin depth is approximately 292 um.

In the event of increasing the Fres resonance frequency of the voltage signal connected to the reaction chamber, the generation of plasma is improved in the dielectric discharge portion of the electrodes, because said portion, by having a capacitive behavior, its impedance decreases with the increase of frequency, allowing a better transfer of power to the inside of the reaction chamber.

d. A transformer with a turns ratio allowing the steady operation of the plasma when already started.
   Its basic operating parameters are:
   N1/N2: Turns ratio.
   An increase in the amount of turns in both N1 and N2, keeping the same turns ratio, improves the magnetic coupling of the primary and secondary stages of the transformer, which allows a higher power transfer. It should be considered that once the plasma starts, it demands higher levels of instantaneous current; this is why this phenomenon should be considered in the design of the transformer coupling.
   A lower turns ratio (high elevation) allows to regulate and limit the current delivered to the plasma reaction chamber, keeping the discharge in glow discharge regime. By limiting the current, the maximum amount of power to be delivered to the reaction chamber is also limited; this is why a suitable turns ratio should be selected in order to provide the desired power, without affecting the glow discharge regime.
   Lk: Leakage inductance.
   Lm: Magnetization inductance.
   Vp: Voltage in the transformer's primary side.
   Ip: Current in the transformer's secondary side.
   Both the leakage inductance and the magnetization inductance increase with the number of turns in the transformer's primary side, which translates into a smaller drift of the system's resonance frequency when plasma is generated.

e. The reaction chamber, which has a variable load depending on whether plasma has been initiated, is modeled as an RLC system, since it can show inductive and capacitive behaviors due to constructive factors.
   Its basic operating parameters are:
   Rp: The resistive component corresponds to the energy consumption that dissipates the plasma for its operation.
   Lp: The inductive component corresponds to the effects produced by the plasma central channel.
   Cp: The capacitive component is mostly associated to the effect of the "capacitive electrodes", which increase the electric field, but are not in direct constant with the fluid.

Considering the conjunction of the aspects composing the present invention, according to a preferred embodiment hereof and the design considerations presented, a reaction chamber is obtained that operates under a method and system for the treatment of liquids in continuous flow, which are not only efficient in energy terms, but also effective, for instance, in the treatment of contaminated water.

Glossary

Bubble: a body of gas not dissolved in a liquid.
Condensation of the biphasic flow: Transition between the biphasic liquid/gas flow and the liquid flow of the discharge, where the biphasic fluid slows down in an inelastic collision against the liquid phase, transforming the variation in the amount of movement in pressure that drives the liquid phase outside the reaction chamber.
Gas-liquid volumetric fraction: Proportion between the volume of the gaseous portion and the volume of the liquid portion.
Liquid phase: Liquid containing dissolved gases and bubbles in a proportion where the liquid volumetric portion is much greater than the gaseous volumetric portion.
Biphasic flow: Flow of fluid containing dissolved gases, vapor, bubbles and suspending drops, in a proportion where the gaseous volumetric portion is much greater than the liquid volumetric portion, and pressure is lower than the atmospheric pressure and greater than the vapor pressure of the liquid.
Reaction chamber: A device that through an inlet opening receives a fluid in liquid phase at high pressure, accelerates it, atomizes it and decreases its pressure through a nozzle, transforming it into a biphasic flow, ionizing the latter by the application of an electric field through electrodes, and condensing the same in a liquid phase and ejecting the latter through an outlet opening.
Turbulent flow: Irregular flow characterized by fast space-temporal changes of pressure and velocity.
Nozzle: Element that speeds up the flow by means of the difference of pressure between the inlet and discharge thereof, transforming the mechanic energy in form of pressure in kinetic energy.
Breaking voltage: Voltage required to raising the electric field in the biphasic flow enough to break the dielectric capacity and ionize it, thus starting the generation of plasma.
Partial adiabatic evaporation: Evaporation of the liquid generated when the flow is exposed to a pressure drop to a level below the saturation pressure thereof, forcing it to evaporate partially. Since this is an adiabatic process, the evaporation uses the internal energy of the liquid.
Inelastic collision: A type of collision in which the kinetic energy is not kept and the velocity of the bodies becomes equal, thus maintaining the same amount of momentum of the system.
Non-thermal plasma: Type of plasma of low current and high voltage generated at a lower pressure than the atmospheric pressure, with an excitation electric current lower than 10 A, which includes the formation of plasma of the following types: glow discharge, abnormal glow discharge, and transition to non-thermal arc discharge.
Current limiter: Device that limits the maximum amount of electric current that can circulate to a charge. This device can be passive in the form of a steady self-adjusting system, or active in the form of a feedback controller.

The invention claimed is:
1. A method for the treatment of liquids in continuous flow, characterized in that said method comprises the following steps:
   a. pressurizing a flow of liquid to a liquid pressure of between 0.5 and 150 bar(g), by means of at least one high pressure pump;
   b. speeding up the pressurized flow of liquid under turbulent conditions towards a reaction chamber, by at least one nozzle placed at an inlet section of the reaction chamber;

c. receiving the flow of liquid in the reaction chamber through at least one inlet opening in said reaction chamber, directing said flow of liquid to the inlet section of the reaction chamber;
d. converting the flow of liquid in a biphasic liquid-gas flow in said inlet section;
e. directing, by the at least one nozzle, the biphasic flow to a central section of the reaction chamber, where an electric field is applied, such that said biphasic flow contacts internal walls of the reaction chamber in its central section, wherein the reaction chamber has an axial momentum efficiency value of between 0.10 to 0.99, wherein the axial momentum efficiency corresponds to the loss of momentum of the biphasic flow due to loss of axial speed of the flow along the reaction chamber and the axial momentum efficiency is calculated using the following equation:

$$\eta_{momentum} = \frac{A_1}{A_2} + \frac{A_2(P_2 - P_v)}{2A_1\eta_{nozzle}(P_1 - P_v)}$$

wherein,
$\eta_{momentum}$ is the actual momentum efficiency;
$A_1$ is the cross-sectional area of a nozzle constraint at the inlet section of the reaction chamber;
$A_2$ is the cross-sectional area of the nozzle constraint at the central section of the reaction chamber;
$P_v$ is the vapor pressure of the fluid;
$P_1$ is the inlet fluid pressure;
$P_2$ is the discharge fluid pressure; and
$\eta_{nozzle}$ is the energy conversion efficiency of the pressure variation in kinetic energy, calculated with the following equation:

$$\eta_{nozzle} = \frac{m^2}{2\rho_{Liq}A_1^2(\Delta P)}$$

wherein,
m is a mass flow;
$\Delta P$ is a pressure difference of the nozzle; and
$\rho_{Liq}$ is a liquid density;
f. ionizing the gaseous fraction of the biphasic flow that passes through said central section, as a result of the interaction between the biphasic flow and the applied electric field;
g. sustaining an ionization regime that generates non-thermal plasma throughout the central section of the reaction chamber, where said regime is sustained by controlling the electric field applied in said central section;
h. directing the biphasic flow under the ionization regime to a discharge section of the reaction chamber, apart from the central section where the electric field is applied, generating a deionization of the gaseous fraction and causing the biphasic flow to reduce its velocity, which results in the condensation of biphasic flow; and
i. removing a flow of treated fluid from said discharge section through at least one discharge opening in the reaction chamber.

2. The method according to claim 1, characterized in that the flow of fluid speeded up under turbulent conditions generates a pressure drop in the inlet section of the reaction chamber, promoting an increase in the contact surface between the phases forming the biphasic flow.

3. The method according to claim 1, characterized in that the step of converting the flow of liquid in the biphasic flow is promoted by the partial release of gases dissolved in the liquid to be treated and the partial evaporation thereof.

4. The method according to claim 1, characterized in that the central section comprises at least a pair of electrodes that generate an electric discharge to produce the electric field applied in said central section.

5. The method according to claim 4, characterized in that the step of sustaining an ionization regime that generates non-thermal plasma comprises the application of an electric field between the electrodes, which intensity exceeds the breakdown voltage of the gaseous phase of said biphasic flow.

6. The method according to claim 5, characterized in that the electric field is generated through a potential difference between the electrodes, where said potential difference is applied by at least one power source.

7. The method according to claim 6, characterized in that the step of sustaining the ionization regime that generates non-thermal plasma comprises the use of a current limiter in order to limit the current circulating through the electrodes.

8. The method according to claim 7, characterized in that the current limiter is integrated in the at least one power source that applies the potential difference.

9. The method according to claim 1, characterized in that directing the biphasic flow to the discharge section of the reaction chamber comprises reconverting the biphasic flow in a flow of liquid.

10. The method according to claim 1, characterized in that the non-thermal plasma has an energy density between 0.144 and 7 W/mm$^3$.

11. A reaction chamber for the treatment of liquids, characterized in that it comprises:
at least one inlet opening, through which a flow of liquid to be treated in the reaction chamber is received, wherein said flow of liquid is pressurized;
an inlet section, where said flow of liquid to be treated is converted into a biphasic liquid-gas flow;
a central section configured to apply an electric field inside the reaction chamber, ionizing the gaseous fraction of the biphasic flow passing through the central section, and to sustain an ionization regimen, generating non-thermal plasma throughput the central section by the control of the applied electric field;
a discharge section next to the central zone with the electric field, where a deionization of the gaseous fraction is generated, and the velocity of the biphasic flow is reduced, which results in the condensation of the biphasic flow; and
at least one discharge opening through which a flow of treated liquid is removed,
wherein the inlet section of the reaction chamber comprises at least a nozzle arranged in such a way to speed up the flow of liquid in turbulent conditions, promoting the biphasic flow to have a larger contact surface between the phases making it up, wherein the nozzle directs the biphasic flow in a turbulent manner towards internal walls of the reaction chamber, mainly in its central section, and
wherein the reaction chamber has an axial momentum efficiency value of between 0.10 to 0.99, wherein the axial momentum efficiency corresponds to the loss of momentum of the biphasic flow due to loss of axial speed of the flow along the reaction chamber and the axial momentum efficiency is calculated using the following equation:

$$\eta_{momentum} = \frac{A_1}{A_2} + \frac{A_2(P_2 - P_v)}{2A_1 \eta_{nozzle}(P_1 - P_v)}$$

wherein, $\eta_{momentum}$ is the actual momentum efficiency;

$A_1$ is the cross-sectional area of a nozzle constraint at the inlet section of the reaction chamber;

$A_2$ is the cross-sectional area of the nozzle constraint at the central section of the reaction chamber;

Pv is the vapor pressure of the fluid;

$P_1$ is the inlet fluid pressure;

$P_2$ is the discharge fluid pressure; and $\eta_{nozzle}$ is the energy conversion efficiency of the pressure variation in kinetic energy, calculated with the following equation:

$$\eta_{nozzle} = \frac{m^2}{2\rho_{Liq} A_1^2 (\Delta P)}$$

wherein, m is a mass flow;

ΔP is a pressure difference of the nozzle; and $\rho_{Liq}$ is a liquid density.

12. The reaction chamber according to claim 11, characterized in that the nozzle comprises a discharge section expanding into the reaction chamber by increasing the cross-section of said discharge section of the nozzle, generating a pressure drop in the inlet section of the reaction chamber.

13. The reaction chamber according to claim 11, characterized in that the nozzle speeds up the flow of fluid in order to reach a speed between 15 and 60 m/s.

14. The reaction chamber according to claim 11, characterized in that the central section comprises at least a pair of electrodes that generate an electric discharge in order to produce the electric field applied in said central section.

15. The reaction chamber according to claim 14, characterized in that the electric field between the electrodes has an intensity exceeding the breaking voltage of the gaseous portion of the biphasic flow.

16. A system for the treatment of liquids in continuous flow, characterized in that it comprises:

at least one reaction chamber according to claim 11, arranged to receive a flow of fluid for treatment;

at least one high-pressure pump upstream the at least one reaction chamber to pressurize the fluid to be treated before entering the reaction chamber and increasing the fluid pressure to between 0.5 and 150 bar(g); and at least one current limiter, able to control the electric field applied in the central section of the at least one reaction chamber, limiting the current that circulates through the electrodes.

17. The system according to claim 16, characterized in that the at least one high-pressure pump pressurizes the fluid to between 2 and 70 bar(g).

18. The system according to claim 17, characterized in that it also comprises a pressure gauge placed between the at least one high pressure pump and the at least one inlet opening of the at least one reaction chamber for the control of the reaction chamber's feeding pressure.

19. The system according to claim 16, characterized in that it also comprises at least one vacuum pump downstream the at least one reaction chamber.

20. The system according to claim 19, characterized in that it also comprises a vacuum gauge placed between the at least one discharge opening of the reaction chamber and the at least one vacuum pump for the control of the vacuum level in the discharge section of the at least one reaction chamber.

21. The system according to claim 16, characterized in that it also comprises a flow gauge downstream the at least one reaction chamber for the control of the flow rate of the treated liquid.

22. The system according to claim 16, characterized in that it also comprises at least one power source, where the electric field is generated through a potential difference between at least one pair of electrodes in the central section of the at least one reaction chamber, where said potential difference is applied by the at least one power source.

23. The system according to claim 22, characterized in that the at least one current limiter is integrated to the at least one power source that applies the potential difference.

24. The system according to claim 16, characterized in that the at least one discharge opening in the discharge section of the at least one reaction chamber is connected to at least one conduit with a cross-section greater than the at least one discharge opening, thus facilitating a reconversion of the biphasic flow into liquid phase.

25. The system according to claim 16, characterized in that it comprises two or more reaction chambers connected to each other in series or in parallel.

* * * * *